United States Patent
Jo et al.

(10) Patent No.: US 10,114,250 B2
(45) Date of Patent: Oct. 30, 2018

(54) LIQUID CRYSTAL DISPLAY AND MANUFACTURING METHOD THEREOF

(71) Applicant: Samsung Display Co., Ltd., Yongin-si, Gyeonggi-do (KR)

(72) Inventors: Jung Yun Jo, Namyangju-si (KR); Sung Hoon Yang, Seoul (KR)

(73) Assignee: Samsung Display Co., Ltd. (KR)

( * ) Notice: Subject to any disclaimer, the term of this patent is extended or adjusted under 35 U.S.C. 154(b) by 277 days.

(21) Appl. No.: 14/876,546

(22) Filed: Oct. 6, 2015

(65) Prior Publication Data

US 2016/0202553 A1    Jul. 14, 2016

(30) Foreign Application Priority Data

Jan. 8, 2015   (KR) ................ 10-2015-0002982

(51) Int. Cl.
  *G02F 1/1335* (2006.01)
  *G02B 1/18* (2015.01)
  *G02F 1/1333* (2006.01)

(52) U.S. Cl.
  CPC ......... *G02F 1/133536* (2013.01); *G02B 1/18* (2015.01); *G02F 1/133345* (2013.01); *G02F 2001/133548* (2013.01); *G02F 2001/133567* (2013.01)

(58) Field of Classification Search
  CPC ......... G02F 1/133536; G02F 1/133345; G02F 2001/133548; G02F 1/1333; G02F 1/1335; G02F 1/133528; G02F 1/13363; G02F 1/133553; G02F 2001/133638; G02F 2001/133531; G02F 2001/133567; G02F 2203/01; G02F 2203/02; G02F 2201/50; G02B 1/18; G02B 5/3025; G02B 5/3058; G02B 5/26; G02B 5/045; G02B 5/201; G02B 5/30; G02B 5/3066; G02B 6/0056; G02B 6/0055; G02B 1/08; G02B 1/14;
  (Continued)

(56) References Cited

U.S. PATENT DOCUMENTS

2007/0217008 A1*  9/2007  Wang ................ G02B 5/1809
                                                                  359/485.05
2013/0050825 A1*  2/2013  Takahashi .......... C08G 18/6484
                                                                  359/487.02
(Continued)

FOREIGN PATENT DOCUMENTS

JP       2011-090141 A    5/2011
KR   10-2010-0035783 A    4/2010
(Continued)

*Primary Examiner* — Thoi Duong
(74) *Attorney, Agent, or Firm* — Innovation Counsel LLP

(57) ABSTRACT

A liquid crystal display includes: a lower display panel including a lower polarizing plate disposed between a lower transparent substrate and a passivation layer of the lower display panel; and an upper display panel including an upper polarizing plate disposed between an upper transparent substrate and a passivation layer of the upper display panel, wherein at least one of the lower polarizing plate and the upper polarizing plate is a reflection type polarizing plate and includes a plurality of linear patterns arranged so as to be extended in one direction and a hydrophobic layer covering at least portion of side wall portions of the linear patterns.

10 Claims, 16 Drawing Sheets

(58) Field of Classification Search
CPC ............. H01L 51/5237; B32B 2307/42; B32B 2457/202; B32B 2457/20; C08F 12/20
See application file for complete search history.

(56) References Cited

U.S. PATENT DOCUMENTS

| | | | | |
|---|---|---|---|---|
| 2016/0077264 | A1* | 3/2016 | Kang | G02B 5/3058 430/321 |
| 2016/0077377 | A1* | 3/2016 | Kim | G02B 5/3058 349/96 |
| 2016/0116799 | A1* | 4/2016 | Jang | G02F 1/133528 438/23 |
| 2016/0139313 | A1* | 5/2016 | Kim | B81C 1/00031 359/485.05 |
| 2016/0170115 | A1* | 6/2016 | Kim | G02B 5/3058 359/485.05 |
| 2016/0178822 | A1* | 6/2016 | Kwak | G02B 5/3058 257/72 |
| 2016/0289458 | A1* | 10/2016 | Linford | C09D 5/08 |
| 2016/0291208 | A1* | 10/2016 | Wangensteen | G02B 1/14 |
| 2016/0291226 | A1* | 10/2016 | Linford | G02B 5/3058 |
| 2016/0291227 | A1* | 10/2016 | Nielson | G02B 5/3058 |
| 2016/0299273 | A1* | 10/2016 | Oh | G02B 5/3058 |

FOREIGN PATENT DOCUMENTS

| | | |
|---|---|---|
| KR | 10-2011-0080118 A | 7/2011 |
| KR | 10-1131103 B1 | 3/2012 |
| KR | 10-2012-0058119 A | 6/2012 |
| KR | 10-1320895 B1 | 10/2013 |
| KR | 10-2014-0006840 | 1/2014 |

\* cited by examiner

LIQUID CRYSTAL DISPLAY AND MANUFACTURING METHOD THEREOF

CROSS-REFERENCE TO RELATED APPLICATION

This application claims priority to and the benefit of Korean Patent Application No. 10-2015-0002982 filed in the Korean Intellectual Property Office on Jan. 8, 2015, the entire contents of which are incorporated herein by reference.

BACKGROUND (a) Field

The present invention relates to a liquid crystal display and a manufacturing method thereof.

(b) Description of the Related Art

Liquid crystal displays are one of the most widely used types of flat panel displays. A liquid crystal display includes two sheets of display panels on which electric field generating electrodes such as pixel electrodes, common electrodes, and the like are formed, and a liquid crystal layer inserted therebetween. A liquid crystal display displays an image by applying a voltage to the electric field generating electrodes to generate an electric field on the liquid crystal layer and consequently, determining an orientation of liquid crystal molecules of the liquid crystal layer, which controls polarization of incident light.

Liquid crystal display devices are classified into backlit liquid crystal displays, which display an image using a backlight disposed on a rear of a liquid crystal cell, reflective liquid crystal displays, which display the image using natural and external light, and transflective liquid crystal displays, which are formed by coupling a structure of the backlit liquid crystal display. A structure of the reflective liquid crystal display is operated in a transmission mode displaying the image using an embedded light source of a display element itself in an indoor or a dark place in which an external light source is not present, and is operated in a reflective mode displaying the image by reflecting the external light in an outdoor high illuminance environment, depending on a light source.

Among these, the backlit or transflective liquid crystal display displaying the image using the backlight is mainly used due to a merit that display luminance thereof is high.

However, about 50% of light incident from the backlight is absorbed by a polarizing plate attached onto a lower portion of the liquid crystal display and about the remaining 50% is used for display. Thereby, light efficiency is degraded and display luminance is also decreased.

The above information disclosed in this Background section is only for enhancement of understanding of the background of the invention and therefore it may contain information that does not form the prior art that is already known to a person of ordinary skill in the art.

SUMMARY

A liquid crystal display having advantages of including a polarizing plate improving transmittance and a polarization degree and a manufacturing method of the liquid crystal display is provided.

In one aspect, a liquid crystal display includes: a lower display panel including a lower polarizing plate disposed between a lower transparent substrate and a passivation layer of the lower display panel; and an upper display panel including an upper polarizing plate disposed between an upper transparent substrate and a passivation layer of the upper display panel, wherein at least one of the lower polarizing plate and the upper polarizing plate is a reflection type polarizing plate and includes a plurality of linear patterns arranged so as to be extended in one direction and a hydrophobic layer covering at least a portion of side wall portions of the linear patterns.

The hydrophobic layer may be made of SiOC or a material containing fluorine.

A portion facing at least the linear patterns among the passivation layer of the lower display panel and the passivation layer of the upper display panel may be made of a hydrophobic material.

A portion facing at least the linear patterns among the passivation layer of the lower display panel and the passivation layer of the upper display panel may be formed so as to have a contact angle of 13° or more to 48° or less.

The hydrophobic layer may cover the entire side wall portions of the linear patterns and may be made of SiOC or a material containing fluorine.

A portion facing at least the linear patterns among the passivation layer of the lower display panel and the passivation layer of the upper display panel may be made of a hydrophobic material.

A portion facing at least the linear patterns among the passivation layer of the lower display panel and the passivation layer of the upper display panel may be formed so as to have a contact angle of 13° or more to 48° or less.

The hydrophobic layer may cover at least a portion of upper portions and the side wall portions of the linear patterns and may be made of SiOC or a material containing fluorine.

A portion facing at least the linear patterns among the passivation layer of the lower display panel and the passivation layer of the upper display panel may be made of a hydrophobic material.

A portion facing at least the linear patterns among the passivation layer of the lower display panel and the passivation layer of the upper display panel may be formed so as to have a contact angle of 13° or more to 48° or less.

In another aspect, a manufacturing method of a liquid crystal display includes: stacking metal layers on a transparent substrate; forming linear patterns in a portion of the metal layers, the linear patterns spaced so as to polarize incident light; stacking a hydrophobic layer covering surfaces of the linear patterns; and forming a passivation layer on the metal layers including the linear pattern and the hydrophobic layer.

The hydrophobic layer may be formed of any one of a material containing fluorine and SiOC, or be formed by performing a plasma treatment process with gas containing fluorine on the linear patterns of the metal layers.

The passivation layer may be formed by an inkjet process.

The manufacturing method may further include, after the forming of the linear patterns on the metal layers, stacking a photosensitivity layer on a non-opening part of the metal layer not including the linear patterns; and after the stacking of the hydrophobic layer, removing a portion of the hydrophobic layer together with the photosensitivity layer covering upper portions of the linear patterns of the metal layers.

The hydrophobic layer may be formed of any one of a material containing fluorine and SiOC, or be formed by performing a plasma treatment process with gas containing fluorine on the linear patterns of the metal layers.

The passivation layer may be formed by an inkjet process.

In yet another aspect, a manufacturing method of a liquid crystal display includes: stacking metal layers and a material for hard mask on a transparent substrate; forming linear patterns on the material for hard mask; stacking a hydrophobic layer covering surfaces of the linear patterns of the material for hard mask; forming the linear patterns on the metal layers using the linear patterns of the material for hard mask as a mask; and forming a passivation layer of a polarizing plate on a polarizing plate including the linear patterns of the material for hard mask, the linear patterns of the metal layers, and the hydrophobic layer.

The manufacturing method may further include, after the forming of the linear patterns on the material for hard mask, stacking a photosensitivity layer on a non-opening part of the polarizing plate; and after the forming of the linear patterns on the metal layers, removing a portion covering upper portions of the linear patterns of the material for hard mask of the hydrophobic layer together with the photosensitivity layer.

The hydrophobic layer may be formed of any one of a material containing fluorine and SiOC, or be formed by performing a plasma treatment process with gas containing fluorine on the linear patterns of the metal layers.

The passivation layer may be formed by an inkjet process.

In the method of manufacturing the liquid crystal display, a liquid crystal display having the polarizing plate having improved transmittance and the polarization degree characteristics may be manufactured.

DETAILED DESCRIPTION OF THE EMBODIMENTS

Figure 1:
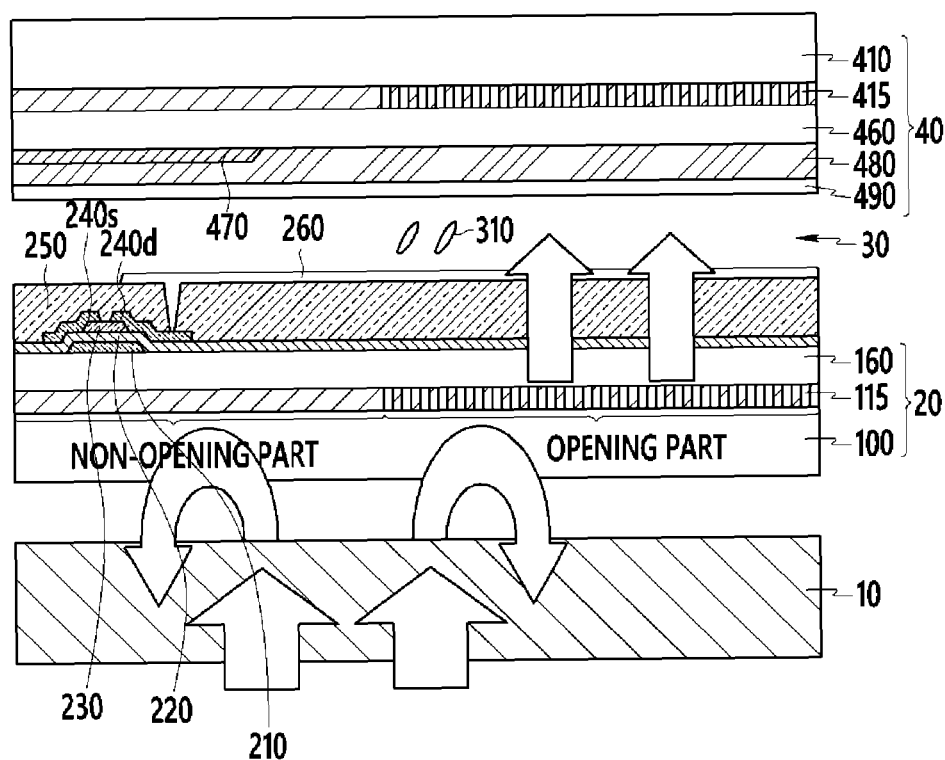
FIG. 1 is a cross-sectional view schematically showing a liquid crystal display according to an exemplary embodiment.

Hereinafter, exemplary embodiments will be described in detail with reference to the accompanying drawings so that those skilled in the art may easily practice the present inventive concept. However, the present invention is not limited to the exemplary embodiments which are described herein, and may be modified in various different ways.

Accordingly, the drawings and description are to be regarded as illustrative in nature and not restrictive. Like reference numerals designate like elements throughout the specification In several exemplary embodiments, components having the same configuration will be described representatively in a first exemplary embodiment by the same reference numerals. In exemplary embodiments other than the first exemplary embodiment, only configurations different from those of the first exemplary embodiment will be described.

In addition, because sizes and thicknesses of the respective components shown in the drawings are arbitrarily shown for the convenience of explanation as the thicknesses are exaggerated in order to clearly express several layers and regions in the drawings, the present invention is not necessarily limited to those shown in the drawings.

In addition, in the case in which it is stated that a portion such as a layer, a film, a region, a plate, or the like is present "on", "over", and "below" another portion, the portion may be directly formed on another portion, or have the other layer interposed therebetween. In addition, unless explicitly described to the contrary, the word "comprise" and variations such as "comprises" or "comprising", will be understood to imply the inclusion of stated elements but not the exclusion of any other elements.

Hereinafter, a liquid crystal display according to an exemplary embodiment will be described with reference to FIGS. 1 to 3.

Figure 2:
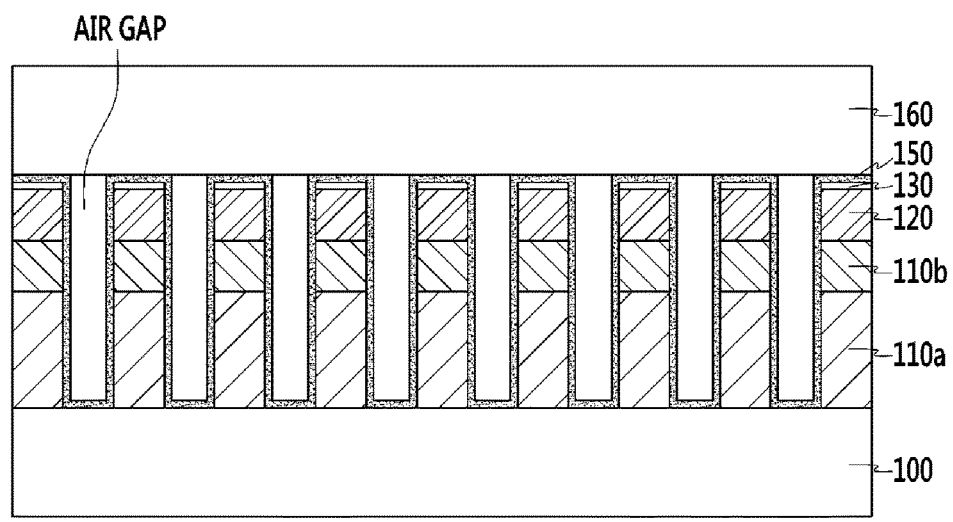
FIG. 2 is an enlarged view of a lower transparent substrate 100, an opening part of a lower polarizing plate 115, and a passivation layer 160 of the lower polarizing plate of FIG. 1.
Figure 3:
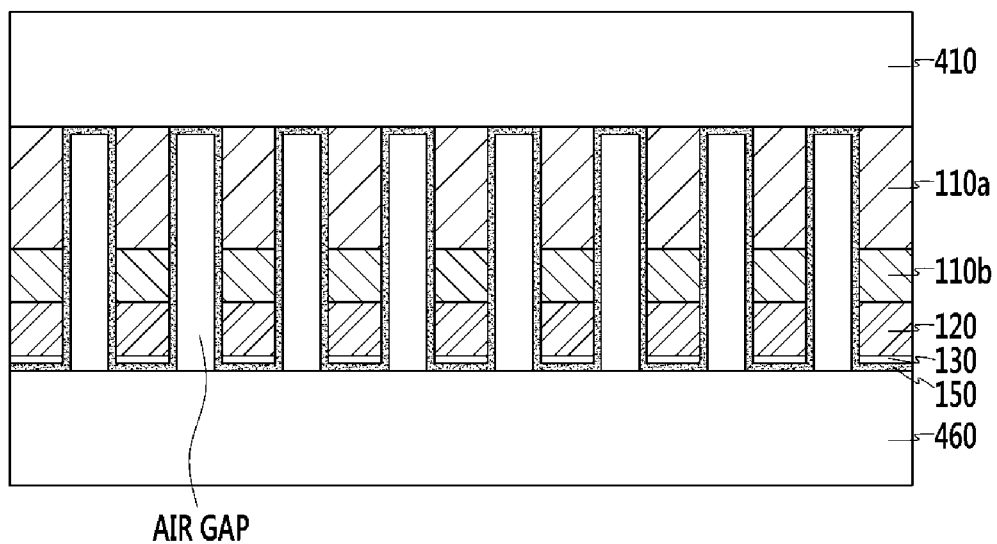
FIG. 3 is an enlarged view of an upper transparent substrate 410, an opening part of an upper polarizing plate 415, and a passivation layer 460 of the upper polarizing plate of FIG. 1.

FIG. 1 is a cross-sectional view schematically showing a liquid crystal display according to an exemplary embodiment, FIG. 2 is an enlarged view of a lower transparent substrate 100, an opening part of a lower polarizing plate 115, and a passivation layer 160 of the lower polarizing plate of FIG. 1, and FIG. 3 is an enlarged view of an upper transparent substrate 410, an opening part of an upper polarizing plate 415, and a passivation layer 460 of the upper polarizing plate of FIG. 1.

Referring to FIG. 1, the liquid crystal display according to an exemplary embodiment includes a backlight unit 10 and a liquid crystal display panel.

First, the backlight unit 10 may include a light source, a light guide plate, a reflecting plate, and an optical sheet. However, the above-mentioned elements are shown only in an integral part in FIG. 1. Light provided from the light source is provided to the liquid crystal display panel, which is at the top, through the light guide plate, the reflecting plate, and the optical sheet. Depending on the exemplary embodiment, a luminance enhancing film formed by repeatedly stacking two layer having different reflective indexes among the optical sheets may also not be included. In the case in which a lower polarizing plate 115 used in the liquid crystal display panel is not an absorption type polarizing plate, but is a reflection type polarizing plate as in the exemplary embodiment of FIG. 1, the luminance enhancing film may not be included. A portion of light generated from the backlight unit 10 is reflected by a non-opening part of the lower polarizing plate 115, a portion thereof is reflected by an opening part, and a portion thereof is transmitted by the opening part. Arrows in FIG. 1 indicate the progress directions of light.

The liquid crystal display panel includes a liquid crystal layer 30, a lower display panel 20, and an upper display panel 40 as shown in FIG. 1.

First, the lower display panel 20 will be described.

The lower polarizing plate 115 is formed on the lower transparent substrate 100 made of transparent glass, plastics, or the like.

The lower polarizing plate 115, which is a reflection type polarizing plate, has an opening part and a non-opening part, and the opening part includes a plurality of linear patterns formed of metal layers 110a and 110b, a material 120 for a hard mask, and the like, and a hydrophobic layer 150 covering the plurality of linear patterns, as shown in FIG. 2. However, the above-mentioned elements are shown only in an integrated part in FIG. 1.

The plurality of linear patterns are extended in one direction and are spaced apart from each other by a predetermined interval. The interval between the linear patterns is smaller than a wavelength of visible ray and has a width of tens to hundreds of nm. The width of the linear pattern may have various widths and may have a width corresponding to the interval between the linear patterns in the present exemplary embodiment. A height of the linear pattern may be changed depending on a material forming the linear pattern and may have a width of tens to hundreds of nm. In addition, the linear pattern includes the metal layers 110a and 110b, and may further include the material 120 for the hard mask, a resin 130, and the like, in addition to the metal layers. The metal layers 110a and 110b may also be made of the same metal so as to be formed of one layer and may also be made of different metals, but in the present exemplary embodiment, the metal layer 110a is made of aluminum (Al) and the metal layer 110b is made of titanium (Ti). As such, in the case in which the plurality of linear patterns are arranged in one direction, the linear patterns may transmit light which is perpendicular to an arrangement direction and may reflect light which is in parallel to the arrangement direction. An interval part between the plurality of linear patterns is filled with air, which is referred to as an air gap in the present disclosure.

The lower polarizing plate 115 includes a hydrophobic layer 150 covering surfaces of the linear pattern, that is, a side wall portion, an upper portion, and a lower portion of the linear pattern. The hydrophobic layer 150 prevents a passivation layer material from being deposited in the air gap between the linear patterns upon performing a passivation layer process protecting the linear patterns, increases an amount of air gap, and improves transmittance and polarization degree characteristics of the polarizing plate. The hydrophobic layer 150 is made of a hydrophobic material, and may be made, for example, of a material containing fluorine or SiOC. The material containing fluorine may be formed by performing a plasma treatment process with gas containing fluorine.

A passivation layer 160 of the lower polarizing plate is formed on the opening part and the non-opening part of the lower polarizing plate 115. In the present exemplary embodiment, the passivation layer 160 of the lower polarizing plate is made of a hydrophobic material, wherein the hydrophobic material decreases a phenomenon that a passivation layer material is deposited in the interval between the linear patterns upon performing the passivation layer process, due to hydrophobic property thereof. Thereby, a decrease in the air gap between the linear patterns is prevented. In the present exemplary embodiment SiOC or the material containing fluorine are mainly used as the passivation layer 160 of the lower polarizing plate. However, the passivation layer 160 of the lower polarizing plate is not limited thereto, but as long as it is the hydrophobic material, any material may be used.

In addition, the overall passivation layer 160 of the lower polarizing plate is made of the hydrophobic material, but because the hydrophobic material is to prevent the passivation layer material from being deposited in the air gap, an exemplary embodiment in which the passivation layer 160 of the lower polarizing plate on the linear pattern of at least the opening part is made of the hydrophobic material is also possible.

Further, the passivation layer 160 of the lower polarizing plate may be made of a general organic layer or inorganic layer, not the hydrophobic material. Because the hydrophobic layer 150 is present, it is possible to prevent the passivation layer material from being deposited in the air gap even though the passivation layer 160 of the lower polarizing plate is not made of the hydrophobic material.

The passivation layer 160 of the lower polarizing plate serves to protect the lower polarizing plate 115 by causing the lower polarizing plate 115 not to be directly in contact with the gate electrode 210 or the like thereon, and may serve as a support as a layer for forming a thin film transistor and a wiring thereon.

The plurality of linear patterns are attached to the passivation layer 160 of the lower polarizing plate and the lower transparent substrate 100 without using a separate resin.

The lower polarizing plate 115 shown in FIG. 1 is an exemplary embodiment formed on the lower transparent substrate 100 so as to be formed in an in-cell type.

Depending on the exemplary embodiment, unlike the lower polarizing plate 115 of FIG. 1, the lower polarizing plate 115 may also be formed in the on-cell type below the lower transparent substrate 100. In this case, the lower polarizing plate 115 is formed on an outer side of the lower transparent substrate 100 and the passivation layer 160 of the lower polarizing plate is disposed below the linear patterns, thereby making it possible to cover and protect the plurality of linear patterns of the lower polarizing plate 115.

Referring to again FIG. 1, a thin film transistor and a pixel electrode are formed on the passivation layer 160 of the lower polarizing plate of the lower display panel 20. The thin film transistor and the pixel electrode may be formed in various structures according to the exemplary embodiment. Hereinafter, the thin film transistor and the pixel electrode will be described based on a simple structure.

A gate line and a gate electrode 210 applied with a gate voltage from the gate line are formed on the passivation layer 160 of the lower polarizing plate. The gate line is mainly extended in a horizontal direction and the gate electrode may protrude from the gate line.

A gate insulating layer 220 made of silicon nitride (SiNx), silicon oxide (SiOx), or the like is formed on the gate line and the gate electrode 210.

A semiconductor 230 made of hydrogenated amorphous silicon (for short, a-Si), polysilicon, or the like is formed on the gate insulating layer 220. The semiconductor 230 is formed on the gate electrode 210 and forms a channel of the thin film transistor.

A plurality of data lines and a plurality of drain electrodes 240d are formed on the semiconductor 230 and the gate insulating layer 220.

The data lines transfer a data voltage and are mainly extended in a vertical direction so as to intersect with the gate lines. Each data line includes a plurality of source electrodes 240s which is extended to the gate electrode 210. The drain electrode 240d is separated from the data line and faces the source electrode 240 while having the gate electrode 210 at the center therebetween.

One gate electrode 210, one source electrode 240s, and one drain electrode 240d form one thin film transistor (TFT) together with the semiconductor 230, and a channel of the thin film transistor is formed in the semiconductor 230 between the source electrode 240s and the drain electrode 240d.

A plurality of ohmic contacts may be formed on the semiconductor 230 and between the source electrode 240a and the drain electrode 240d.

A planarization insulating layer 250 is formed on portions of the data line, the drain electrode 240d, and the exposed semiconductor 230. The planarization insulating layer 250 is made of an organic insulating material and is formed so as to be planarized. The organic insulating material may have photosensitivity and may have a dielectric constant of about 4.0 or less. The planarization insulating layer 250 may be made of an inorganic insulating material, wherein examples of the inorganic insulating material include silicon nitride and silicon oxide. In addition, the planarization insulating layer 250 may have a double layer structure of a lower inorganic layer and an upper organic layer.

A contact hole exposing one end of the drain electrode 240d is formed in the planarization insulating layer 250.

A plurality of pixel electrodes 260 are formed on the planarization insulating layer 250. The pixel electrode 260 may be made of a transparent conductive material such as an ITO, an IZO, or the like.

The pixel electrode 260 is physically and electrically connected to the drain electrode 240 through the contact hole of the planarization insulating layer 250 and is applied with a data voltage from the drain electrode 240d. The pixel electrode 260 to which the data voltage is applied generates an electric field together with a common electrode 490 applied with a common voltage, thereby determining a direction of liquid crystal molecules of the liquid crystal layer 30 between the two electrodes 260 and 490. Polarization of light passing through the liquid crystal layer 30 is changed depending on the direction of the liquid crystal molecule determined as described above. The pixel electrode 260 and the common electrode 490 form a capacitor (hereinafter, referred to as 'liquid crystal capacitor'), so as to maintain the applied voltage even after the thin film transistor is turned off. An alignment layer is formed on the pixel electrode 260.

Hereinafter, the upper display panel 40 will be described.

An upper polarizing plate 415 is formed on the upper transparent substrate 410 made of transparent glass, plastics, or the like.

The upper polarizing plate 415, which is a reflection type polarizing plate, has an opening part and a non-opening part, and the opening part includes a plurality of linear patterns formed of metal layers 110a and 110b, a material 120 for a hard mask, and the like, and a hydrophobic layer 150 covering the plurality of linear patterns, as shown in FIG. 3. However, the above-mentioned elements are shown only in an integrated part in FIG. 1.

The plurality of linear patterns are extended in one direction and are spaced apart from each other by a predetermined interval. The interval between the linear patterns is smaller than a wavelength of visible rays and has a width of tens to hundreds of nm. The width of the linear pattern may have various widths and may have a width corresponding to the interval between the linear patterns in the present exemplary embodiment. A height of the linear pattern may be changed depending on a material forming the linear pattern, and may have a width of tens to hundreds of nm. In addition, the linear pattern includes the metal layers 110a and 110b, and may further include the material 120 for the hard mask, a resin 130, and the like, in addition to the metal layers. The metal layers 110a and 110b may also be made of the same metal so as to be formed of one layer and may also be made of different metals, but in the present exemplary embodiment, the metal layer 110a is made of aluminum (Al) and the metal layer 110b is made of titanium (Ti). As such, in the case in which the plurality of linear patterns are arranged in one direction, the linear patterns may transmit light which is perpendicular to an arrangement direction and may reflect light which is in parallel to the arrangement direction. An interval part between the plurality of linear patterns is filled with air, which is referred to as an air gap in the present disclosure.

The upper polarizing plate 415 includes the hydrophobic layer 150 covering surfaces of the linear pattern, that is, a side wall portion, an upper portion, and a lower portion of the linear pattern. The hydrophobic layer 150 prevents a passivation layer material from being deposited in the air gap between the linear patterns upon performing a passivation layer process protecting the linear patterns, increases an amount of air gap, and improves transmittance and polarization degree characteristics of the polarizing plate. The hydrophobic layer 150 is made of a hydrophobic material, but may be made of a material containing fluorine or SiOC. The material containing fluorine may be formed by performing a plasma treatment process with gas containing fluorine.

As described above, in the exemplary embodiment of FIG. 1, the configuration and the structure of the lower polarizing plate 115 and the upper polarizing plate 415 are the same. However, a direction in which the plurality of linear patterns of the upper polarizing plate 415 are extended and a direction in which the plurality of linear patterns of the lower polarizing plate 115 are extended may form an angle of 90° or other angles depending on exemplary embodiments.

A passivation layer 460 of the upper polarizing plate is formed on the opening part and the non-opening part of the upper polarizing plate 415. In the present exemplary embodiment, the passivation layer 460 of the upper polarizing plate is made of a hydrophobic material, wherein the hydrophobic material decreases a phenomenon that a passivation layer material is deposited in the interval between the linear patterns upon performing the passivation layer process, due to hydrophobic property thereof. Thereby, a decrease in the air gap between the linear patterns is prevented. In the present exemplary embodiment SiOC or the material containing fluorine are mainly used as the passivation layer 460 of the upper polarizing plate. However, the passivation layer 460 of the upper polarizing plate is not limited thereto, but as long as it is the hydrophobic material, any material may be used.

In addition, the overall passivation layer 460 of the upper polarizing plate is made of the hydrophobic material, but because the hydrophobic material is to prevent the passivation layer material from being deposited in the air gap, an exemplary embodiment in which at least the passivation layer 460 of the upper polarizing plate on the linear pattern of the opening part is made of the hydrophobic material is also possible.

Further, the passivation layer 460 of the upper polarizing plate may be made of a general organic layer or inorganic layer, not the hydrophobic material. Because the hydrophobic layer 150 is present, it is possible to prevent the passivation layer material from being deposited in the air gap even though the passivation layer 460 of the upper polarizing plate is not made of the hydrophobic material.

The passivation layer 460 of the upper polarizing plate serves to protect the plurality of linear patterns at the time of the manufacturing process by causing the upper polarizing plate 415 to not be directly in contact with a light blocking member 470, a color filter 480, or the like therebelow, and may serve as a support as a layer for forming a common electrode thereon.

The plurality of linear patterns are attached to the passivation layer 460 of the upper polarizing plate and the upper transparent substrate 410 without using a separate resin.

The upper polarizing plate 415 shown in FIG. 1 is an exemplary embodiment formed below the upper transparent substrate 410 so as to be formed in an in-cell type.

Depending on the exemplary embodiment, unlike the upper polarizing plate 415 of FIG. 1, the upper polarizing plate 415 may also be formed in the on-cell type below the upper transparent substrate 410. In this case, the upper polarizing plate 415 is formed on an outer side of the upper transparent substrate 410 and the passivation layer 460 of the upper polarizing plate is disposed on the linear patterns, thereby making it possible to cover and protect the plurality of linear patterns of the upper polarizing plate 415.

Referring to again FIG. 1, the light blocking member 470, the color filter 480, and the common electrode 490 are formed below the passivation layer 460 of the upper polarizing plate. Depending on the exemplary embodiment, at least one of the light blocking member 470, the color filter 480, and the common electrode 490 may be on the lower display panel 20 and an exemplary embodiment in which all three are formed on the lower display panel 20 is also possible.

In FIG. 1, the light blocking member 470 is formed below the passivation layer 460 of the upper polarizing plate. The light blocking member 470 is also called a black matrix and prevents light leakage. The light blocking member 470 faces the pixel electrode 260, and the light blocking member 470 is formed on a portion corresponding to the gate line and the data line and a portion corresponding to the thin film transistor, thereby preventing light leakage between the pixel electrodes 260. The light blocking member 470 has an opening part in a portion corresponding to the pixel electrode 260.

A plurality of color filters 480 are formed below the passivation layer 460 of the upper polarizing plate and the light blocking member 470. The color filter 480 may cover the opening part of the light blocking member 470 and may be extended to be long in a vertical direction. Each color filter 230 may display one of primary colors such as the three primary colors of red, green and blue. However, the color that the color filter may display is not limited to the three primary colors such as red, green, and blue. For example, the color filter may also display one of cyan, magenta, yellow, and white.

The common electrode 490 is formed below the color filter 480. The common electrode 490 is made of a transparent conductor such as an ITO, an IZO, or the like.

An alignment layer is formed below the common electrode 490.

The liquid crystal layer 30 is formed between the upper display panel 40 and the lower display panel 20. The liquid crystal layer 30 includes liquid crystal molecules 310 having dielectric constant anisotropy. The liquid crystal molecules 310 may have long axes which are perpendicular to or in parallel to surfaces of the two display panels 40 and 20 in a state in which the electric field is not present. The liquid crystal molecules 310 have an alignment direction changed by the electric field generated by the pixel electrode 260 and the common electrode 490.

Hereinafter, exemplary embodiments which may be modified from the exemplary embodiment shown in FIGS. 1 to 3 described above will be described. Because the lower polarizing plate 115 and the passivation layer 160 of the lower polarizing plate, and the upper polarizing plate 415 and the passivation layer 460 of the upper polarizing plate have the same configurations and effects, the description will be provided below based on the lower polarizing plate 115 and the passivation layer 160 of the lower polarizing plate.

Figure 4:
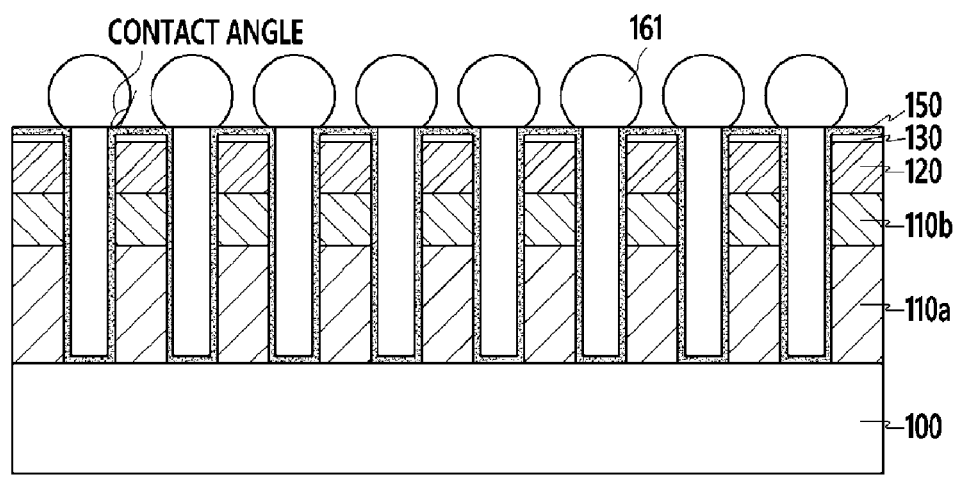
FIG. 4 is an enlarged view of a lower transparent substrate 100, an opening part of a lower polarizing plate, and an inkjet hydrophobic passivation layer 161 of the liquid crystal display according to an exemplary embodiment.

Although the exemplary embodiment shown in FIGS. 1 to 3 described above illustrates the case in which the passivation layer 160 of the lower polarizing plate is formed in a planar shape, the passivation layer 160 of the lower polarizing plate may be formed of an inkjet hydrophobic passivation layer 161 having a droplet shape as shown in FIG. 4 depending on the exemplary embodiment. FIG. 4 is an enlarged view of a lower transparent substrate 100, an opening part of a lower polarizing plate, and an inkjet hydrophobic passivation layer 161 of the liquid crystal display according to an exemplary embodiment.

The above-mentioned inkjet hydrophobic passivation layer 161 may be formed in the droplet shape in each interval between the linear patterns as shown in FIG. 4, and may be alternatively formed so that a droplet covers one or more intervals between the linear patterns. The inkjet hydrophobic passivation layer 161 may be formed by an inkjet process and may be formed so as to have a contact angle of 13° or more to 48° or less. The contact angle is in general an angle formed by a liquid surface and a solid surface when a surface of immovable liquid is in contact with a wall of solid, and in the present disclosure specifically means the angle formed by a surface of the linear pattern and a surface of the inkjet hydrophobic passivation layer 161 as shown in FIG. 4. The larger the contact angle, the larger the hydrophobic property. Particularly, in the case in which the hydrophobic layer 150 is made of a material containing fluorine or SiOC, the inkjet hydrophobic passivation layer 161 may have the contact angle of 38° or more to 48° or less. In the case in which the passivation layer is formed of the inkjet hydrophobic passivation layer 161 as described above, a deposition of the passivation layer material into the air gap between the linear patterns upon performing the passivation process is decreased. Therefore, the amount of air gap is increased and transmittance and polarization degree characteristics of the polarizing plate are improved. Further, according to the present exemplary embodiment, because there are both the hydrophobic layer 150 and the inkjet hydrophobic passivation layer 161, it is possible to more effectively prevent the passivation layer material from being deposited in the air gap.

Because the inkjet hydrophobic passivation layer 161 as described above is to prevent the deposition of the passivation layer material in the air gap, the inkjet hydrophobic passivation layer 161 is effective as long as it is formed so as to block at least an inlet of the interval between the linear patterns of the opening part as shown in FIG. 4, and may also be formed on a planar shape pattern of the non-opening part. In the case in which a portion of the inkjet hydrophobic passivation layer 161 contacting the gate electrode 210, or the like, is not flat due to the contact angle of the inkjet hydrophobic passivation layer 161 being too large, the inkjet hydrophobic passivation layer 161 may not serve as the support layer. In this case, a flat organic layer, or the like may be further formed on the inkjet hydrophobic passivation layer 161 and the lower polarizing plate 115. Even though the above-mentioned flat organic layer, or the like, is further formed, because the inkjet hydrophobic passivation layer 161 blocks the inlet of the interval between the linear patterns, the deposition of the passivation layer material in the air gap is prevented. Because the organic layer, or the like for the above-mentioned flatting is a configuration which is well known in the art, those having ordinary skill in the art may add.

Hereinafter, experimental results will be described showing how much the hydrophobic layer 150 increases the contact angle of the inkjet hydrophobic passivation layer 161. As described above, in the case in which there are both the hydrophobic layer 150 and the inkjet hydrophobic passivation layer 161, the inkjet hydrophobic passivation layer 161 may have the contact angle of 13° or more to 48° or less, and particularly, in the case in which the hydrophobic layer 150 is made of the material containing fluorine or SiOC, the inkjet hydrophobic passivation layer 161 may have the contact angle of 38° or more to 48° or less. Hereinafter, Table 1, which is an experiment result obtained by comparing how much the contact angle of the passivation layer is increased, in the case in which the inkjet hydrophobic passivation layer 161 is deposited on the hydrophobic layer 150 formed of SiOC or formed by performing a plasma treatment process with SF6 and in the case in which the inkjet hydrophobic passivation layer 161 is formed on the material for hard mask made of SiOx is appended. The inkjet hydrophobic passivation layer 161 may be formed of organic material.

TABLE 1

| Position | SiOx | After SF6 PT Process | SiOC |
| --- | --- | --- | --- |
| Left and Upper | 14.51 | 47.94 | 43.97 |
| Left and Middle | 13.70 | 47.39 | 42.29 |
| Left and Lower | 14.36 | 38.63 | 43.45 |

TABLE 1-continued

| Position | SiOx | After SF6 PT Process | SiOC |
| --- | --- | --- | --- |
| Middle and Upper | 16.12 | 45.07 | 42.70 |
| Middle and Middle | 18.78 | 45.71 | 43.29 |
| Middle and Lower | 16.19 | 40.03 | 41.91 |
| Right and Upper | 18.52 | 41.32 | 44.88 |
| Right and Middle | 25.99 | 45.22 | 44.60 |
| Right and Lower | 16.34 | 39.33 | 42.94 |
| average | 17.17 | 43.40 | 43.34 |
| Maximum | 25.99 | 47.94 | 44.88 |
| Minimum | 13.70 | 38.63 | 41.91 |

Referring to Table 1, in the case in which the inkjet hydrophobic passivation layer 161 is formed on the material for hard mask made of SiOx without the hydrophobic layer 150, a contact angle between the inkjet hydrophobic passivation layer 161 and the linear pattern is between 13.70 and 25.99. On the other hand, in the case in which the inkjet hydrophobic passivation layer 161 is formed on the hydrophobic layer 150 which is subjected to the plasma treatment process with SF6, it may be seen that the contact angle is between 47.94 and 38.63. In the case in which the inkjet hydrophobic passivation layer 161 is formed on the hydrophobic layer 150 made of SiOC, it may be seen that the contact angle is between 44.88 and 41.91. Referring to the above-mentioned results, it may be seen that the inkjet hydrophobic passivation layer 161 has the contact angle of 13° or more to 48° or less in the case in which there is only the inkjet hydrophobic passivation layer 161 without the hydrophobic layer 150, and the inkjet hydrophobic passivation layer 161 is formed at the contact angle of 38° or more to 48° or less in the case in which the inkjet hydrophobic passivation layer 161 is formed on the hydrophobic layer 150 made of SiOC or formed by performing the plasma treatment process with SF6. It may be seen that the contact angle is increased by 25° or more in the case in which there is the hydrophobic layer 150 formed of SiOC or formed by performing the plasma treatment process with SF6, as compared to the case in which there is no the hydrophobic layer 150. Because the larger the contact angle, the larger the hydrophobic property, the deposition of the passivation layer material in the air gap between the linear patterns upon performing the passivation layer process is decreased and transmittance and polarization degree characteristics of the polarizing plate are improved.

Hereinafter, a manufacturing method of the liquid crystal display shown in FIGS. 1 and 2 described above will be described with reference to FIGS. 1, 2 and 5 to 8. FIGS. 5 to 8 are views sequentially showing a manufacturing method of a liquid crystal display according to an exemplary embodiment based on the opening part of the lower polarizing plate. A description of constitution materials and detailed structures already described with respect to FIGS. 1 to 3 will be omitted.

Figure 5:
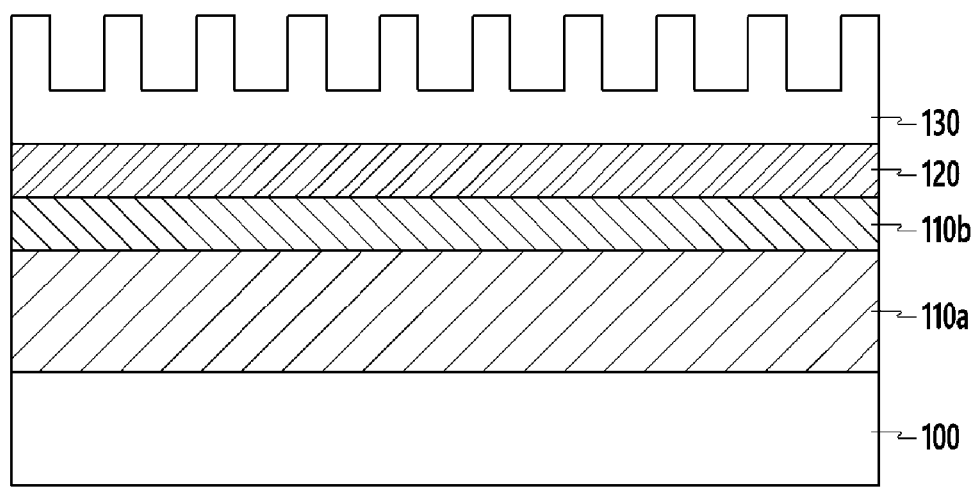
FIGS. 5, 6, 7, and 8 are views sequentially showing a manufacturing method of a liquid crystal display according to an exemplary embodiment based on the opening part of the lower polarizing plate.
Figure 6:
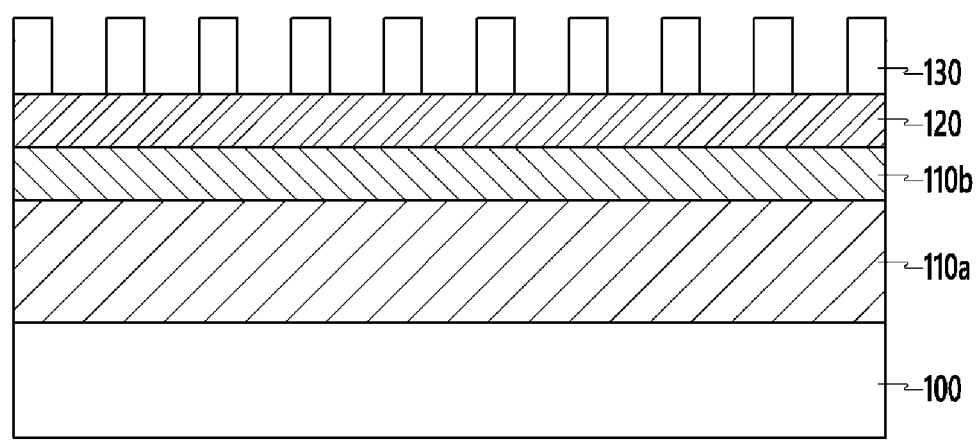
Figure 7:
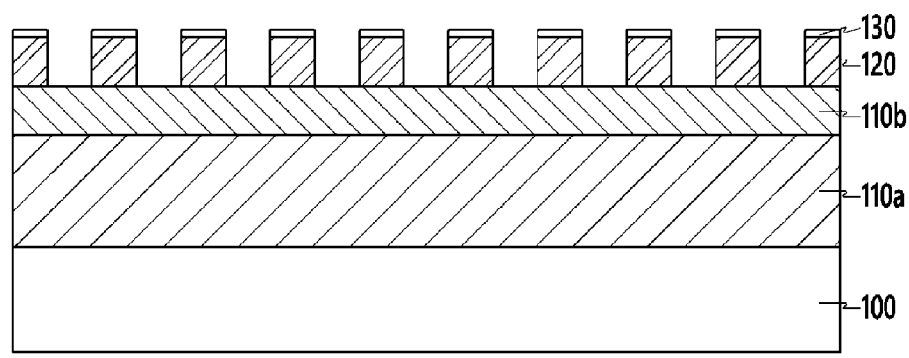
Figure 8:
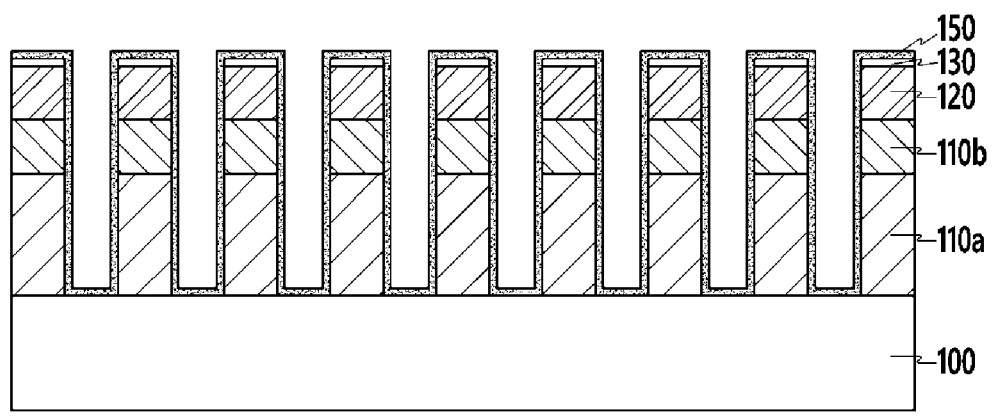

First, as shown in FIG. 5, after the metal layers 110a and 110b, the material 120 for hard mask, and the resin 130 are sequentially stacked on the transparent substrate, an opening part of the resin 130 is pressurized by a linear pressurization mold. Next, as shown in FIG. 6, linear patterns are formed by etching the resin 130. Next, as shown in FIG. 7, the material 120 for hard mask is linearly patterned using the resin linear patterns and the resin linear patterns are removed. Depending on the exemplary embodiment, the resin 130 may be processed so that only a portion thereof remains as shown in FIG. 7, without being perfectly removed. Next, as shown in FIG. 8, the metal layers 110a and 110b are etched in the linear patterns using the linear patterns made of the material for hard mask as an etching mask and the hydrophobic layer 150 is formed so as to cover surfaces of the linear patterns of the metal layers, that is, side wall portions, upper portions, and lower portions of the linear patterns. The hydrophobic layer 150 may be formed of a material containing fluorine or SiOC. The material containing fluorine may be formed by performing a plasma treatment process with gas containing fluorine. Finally, as shown in FIG. 2, the passivation layer 160 of the lower polarizing plate is formed on the linear patterns and the hydrophobic layer 150. The passivation layer 160 of the lower polarizing plate is formed of a hydrophobic material.

Here, in the case in which the passivation layer 160 of the lower polarizing plate is formed by an inkjet process, the above-mentioned manufacturing method is a manufacturing method of the exemplary embodiment shown in FIG. 4.

Figure 9:
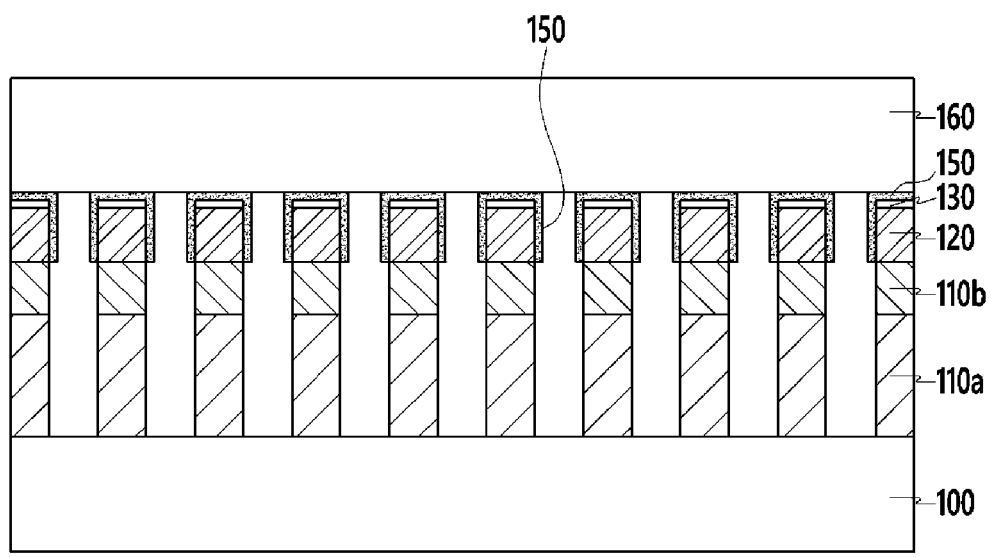
FIG. 9 is an enlarged view of a lower transparent substrate 100, an opening part of a lower polarizing plate, and a passivation layer 160 of the lower polarizing plate of the liquid crystal display according to an exemplary embodiment.

Hereinafter, a liquid crystal display according to an exemplary embodiment will be described based on the lower polarizing plate with reference to FIG. 9. FIG. 9 is an enlarged view of a lower transparent substrate 100, an opening part of a lower polarizing plate, and a passivation layer 160 of the lower polarizing plate of the liquid crystal display according to an exemplary embodiment. A description of the same configurations and structures as the exemplary embodiments described above will be omitted.

Referring to FIG. 9, the linear patterns made of the metal layers 110a and 110b and the material 120 for hard mask are present on the lower transparent substrate 100, and the hydrophobic layer 150 is formed only on a portion which is adjacent to the passivation layer 160 of the lower polarizing plate of the side wall parts of the linear patterns and the upper portions of the linear patterns. Because the purpose of the hydrophobic layer 150 is to prevent the passivation layer material from being deposited between the linear patterns, the hydrophobic layer 150 is effective as long as it is formed on at least the portion of the side wall parts of the linear patterns in the lower polarizing plate which are adjacent to the passivation layer 160. The passivation layer 160 of the lower polarizing plate may be formed of a hydrophobic material.

In addition, although not separately shown, an exemplary embodiment having an inkjet hydrophobic passivation layer 161 instead of the passivation layer 160 of the lower polarizing plate in the exemplary embodiment of FIG. 9 is possible. The inkjet hydrophobic passivation layer 161 has a contact angle of 13° or more to 48° or less and particularly, in the case in which the hydrophobic layer 150 is made of a material containing fluorine or SiOC, the inkjet hydrophobic passivation layer 161 may have the contact angle of 38° or more to 48° or less.

Figure 10:
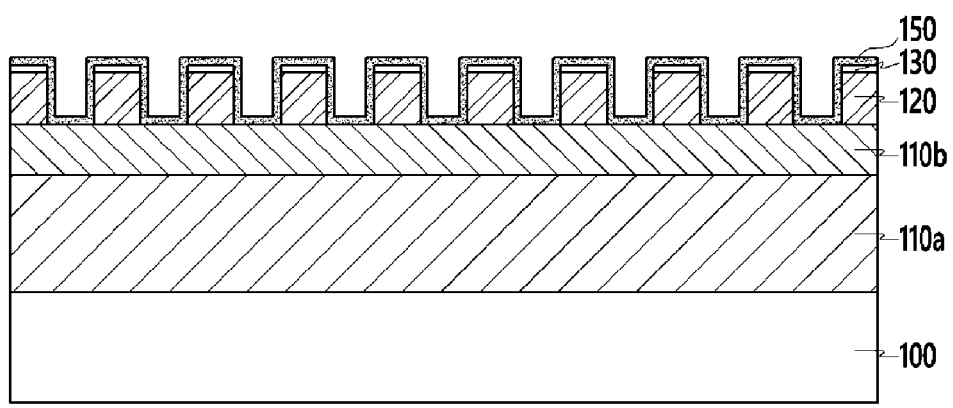
FIG. 10 is a view showing one operation of the manufacturing method of the liquid crystal display according to an exemplary embodiment based on the opening part of the lower polarizing plate.

Hereinafter, a manufacturing method of the liquid crystal display shown in FIG. 9 described above will be described with reference to FIGS. 5 to 7, 9, and 10. FIG. 10 is a view showing one operation of the manufacturing method of the liquid crystal display according to an exemplary embodiment based on the opening part of the lower polarizing plate. Because a description of the same configurations and structures may make reference to the description of the exemplary embodiments described above, repetitive description will be omitted.

First, as shown in FIG. 5, after the metal layers 110a and 110b, the material 120 for hard mask, and the resin 130 are sequentially stacked on the transparent substrate, an opening part of the resin 130 is pressurized by a linear pressurization mold. Next, as shown in FIG. 6, linear patterns are formed by etching the resin 130. Next, as shown in FIG. 7, the material 120 for hard mask is linearly patterned using the resin linear patterns and the resin linear patterns are removed. Depending on the exemplary embodiment, the resin 130 may be processed so that only a portion thereof remains as shown in FIG. 7, without being perfectly removed. Next, as shown in FIG. 10, the hydrophobic layer 150 is formed so as to cover surfaces of the linear patterns made of the material for the hard mask, that is, side wall portions, upper portions, and lower portions of the linear patterns. The hydrophobic layer 150 may be formed of a material containing fluorine or SiOC. The material containing fluorine may be formed by performing a plasma treatment process with gas containing fluorine. Finally, as shown in FIG. 9, the metal layers 110a and 110b are etched in the linear patterns using the linear patterns made of the material for hard mask as an etching mask, and the passivation layer 160 of the lower polarizing plate is formed on the linear patterns and the hydrophobic layer 150. The passivation layer 160 of the lower polarizing plate may be formed of a hydrophobic material.

Figure 11:
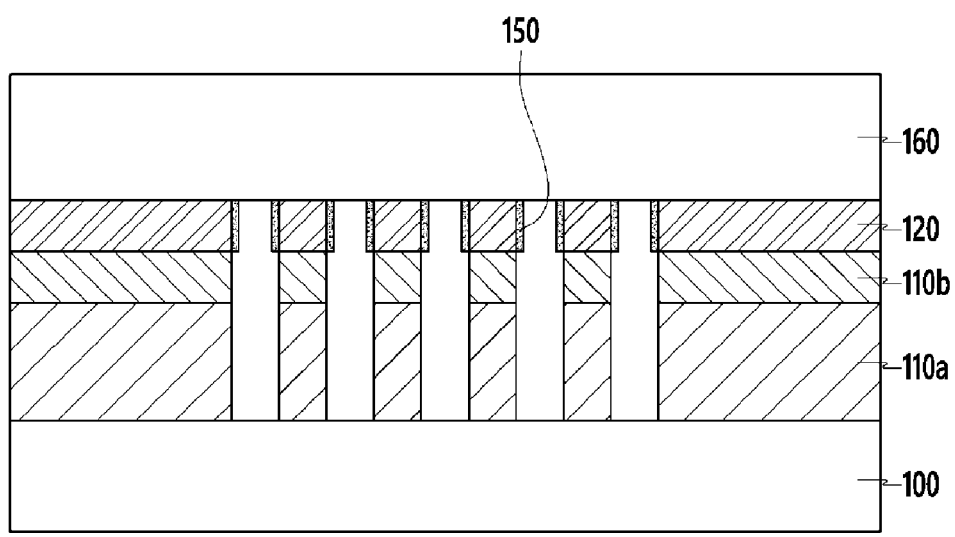
FIG. 11 is an enlarged view of a lower transparent substrate 100, an opening part and a non-opening part of a lower polarizing plate, and a passivation layer 160 of the lower polarizing plate of the liquid crystal display according to an exemplary embodiment.
Figure 12:
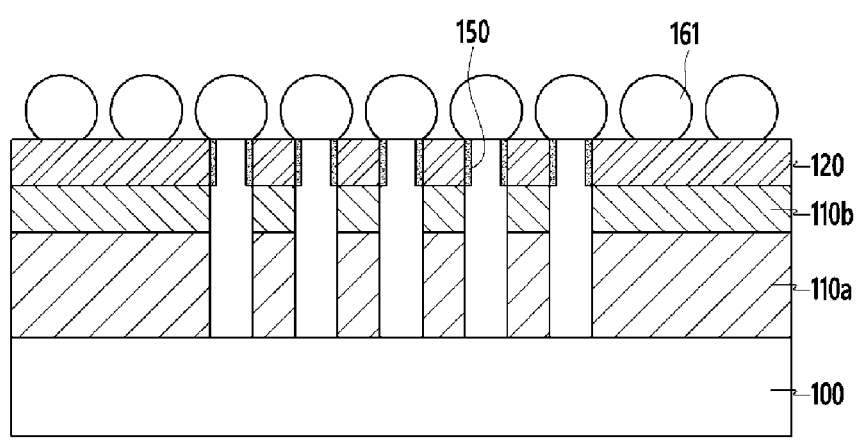
FIG. 12 is an enlarged view of a lower transparent substrate 100, an opening part and a non-opening part of a lower polarizing plate, and an inkjet hydrophobic passivation layer 161 of the liquid crystal display according to an exemplary embodiment.

Here, in the case in which the passivation layer 160 of the lower polarizing plate is formed by an inkjet process, although not separately shown, an exemplary embodiment having an inkjet hydrophobic passivation layer 161 instead of the passivation layer 160 of the lower polarizing plate 160 in the exemplary embodiment of FIG. 9 is possible Hereinafter, a liquid crystal display according to an exemplary embodiment will be described based on the lower polarizing plate with reference to FIGS. 11 and 12. FIG. 11 is an enlarged view of a lower transparent substrate 100, an opening part and a non-opening part of a lower polarizing plate, and a passivation layer 160 of the lower polarizing plate of the liquid crystal display according to an exemplary embodiment and FIG. 12 is an enlarged view of a lower transparent substrate 100, an opening part and a non-opening part of a lower polarizing plate, and an inkjet hydrophobic passivation layer 161 of the liquid crystal display according to an exemplary embodiment. A description of the same configurations and structures as the exemplary embodiments described above will be omitted.

Referring to FIG. 11, the linear patterns made of the metal layers 110a and 110b and the material 120 for hard mask are present in the opening part on the lower transparent substrate 100, and the hydrophobic layer 150 is formed only on a portion which is adjacent to the passivation layer 160 of the lower polarizing plate of the side wall parts of the linear patterns. Because the hydrophobic layer 150 is to prevent the passivation layer material from being deposited between the linear patterns, the hydrophobic layer 150 is effective as long as it is formed on at least the portion which is adjacent to the passivation layer 160 of the lower polarizing plate of the side wall parts of the linear patterns. The passivation layer 160 of the lower polarizing plate may be formed of a hydrophobic material.

An exemplary embodiment of FIG. 12 has an inkjet hydrophobic passivation layer 161 instead of the passivation layer 160 of the lower polarizing plate in the exemplary embodiment of FIG. 11 described above. The inkjet hydrophobic passivation layer 161 has a contact angle of 13° or more to 48° or less and particularly, in the case in which the hydrophobic layer 150 is made of a material containing fluorine or SiOC, the inkjet hydrophobic passivation layer 161 may have the contact angle of 38° or more to 48° or less.

Figure 13:
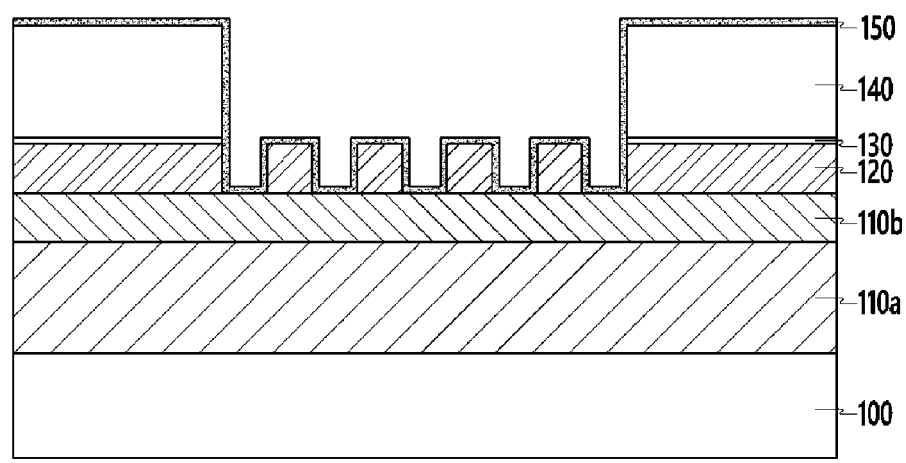
FIG. 13 is a view sequentially showing a manufacturing method of a liquid crystal display according to an exemplary embodiment of the present invention based on the opening part and the non-opening part of the lower polarizing plate.

Hereinafter, a manufacturing method of the liquid crystal display shown in FIGS. 11 and 12 described above will be described with reference to FIGS. 11 to 13. FIG. 13 is a view sequentially showing a manufacturing method of a liquid crystal display according to an exemplary embodiment based on the opening part and the non-opening part of the lower polarizing plate. Description of the same configurations and structures referenced in the description of the exemplary embodiments described above will be omitted.

First, after the metal layers 110a and 110b, the material 120 for hard mask, and the resin 130 are sequentially stacked on the transparent substrate, an opening part of the resin 130 is pressurized by a linear pressurization mold. Next, linear patterns are formed by etching the resin 130. Next, the material 120 for the hard mask is linearly patterned using the resin linear patterns and the resin linear patterns are removed. Depending on the exemplary embodiment, the resin 130 may be processed so that only a portion thereof remains as shown in FIG. 13, without being perfectly removed. Next, as shown in FIG. 13, a photosensitivity layer 140 is formed on a non-opening part that does not have the linear patterns made of the material 120 for hard mask. The hydrophobic layer 150 is formed so as to cover the photosensitivity layer 140 and surfaces of the linear patterns made of the material for the hard mask, that is, side wall portions, upper portions, and lower portions of the linear patterns. The hydrophobic layer 150 may be formed of a material containing fluorine or SiOC. The material containing fluorine may be formed by performing a plasma treatment process with gas containing fluorine. Next, the photosensitive layer 140 is removed. In this case, a portion covering the upper portions of the linear patterns of the hydrophobic layer 150 is removed together with the photosensitive layer 140. In the case in which the hydrophobic layer 150 on the surfaces of the linear patterns is removed, adhesion between the linear patterns and the hydrophobic passivation layer may be improved. Finally, as shown in FIG. 11, after the metal layers 110a and 110b are etched in the linear patterns using the linear patterns made of the material for the hard mask as an etching mask, the passivation layer 160 of the lower polarizing plate is formed on the linear patterns and the hydrophobic layer 150. The passivation layer 160 of the lower polarizing plate may be formed of a hydrophobic material.

Here, in the case in which the passivation layer 160 of the lower polarizing plate is formed by an inkjet process, the above-mentioned manufacturing method is a manufacturing method of the exemplary embodiment shown in FIG. 12.

Figure 14:
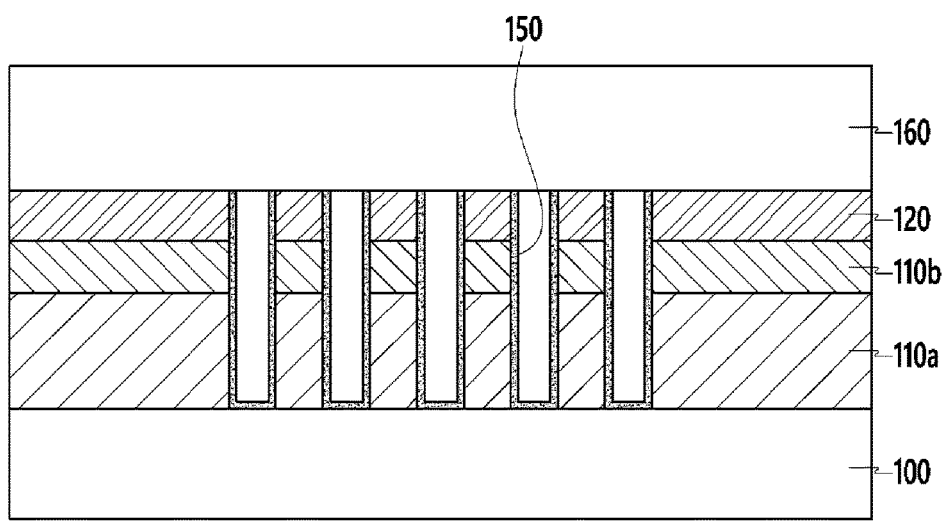
FIG. 14 is an enlarged view of a lower transparent substrate 100, an opening part and a non-opening part of a lower polarizing plate, and a passivation layer 160 of the lower polarizing plate of the liquid crystal display according to an exemplary embodiment.

Hereinafter, a liquid crystal display according to an exemplary embodiment will be described based on the lower polarizing plate with reference to FIG. 14. FIG. 14 is an enlarged view of a lower transparent substrate 100, an opening part and a non-opening part of a lower polarizing plate, and a passivation layer 160 of the lower polarizing plate of the liquid crystal display according to an exemplary embodiment. A description of the same configurations and structures as the exemplary embodiments described above will be omitted.

Referring to FIG. 14, the linear patterns made of the metal layers 110a and 110b and the material 120 for the hard mask are present in the opening part on the lower transparent substrate 100, and the hydrophobic layer 150 is formed on the side wall portions and the lower portions of the linear patterns. The passivation layer 160 of the lower polarizing plate on the linear patterns and the hydrophobic layer 150 may be formed of a hydrophobic material.

In addition, although not separately shown, an exemplary embodiment having an inkjet hydrophobic passivation layer 161 instead of the passivation layer 160 of the lower polarizing plate 160 in the exemplary embodiment of FIG. 14 is possible. The inkjet hydrophobic passivation layer 161 has a contact angle of 13° or more to 48° or less and particularly, in the case in which the hydrophobic layer 150 is made of a material containing fluorine or SiOC, the inkjet hydrophobic passivation layer 161 may have the contact angle of 38° or more to 48° or less.

Figure 15:
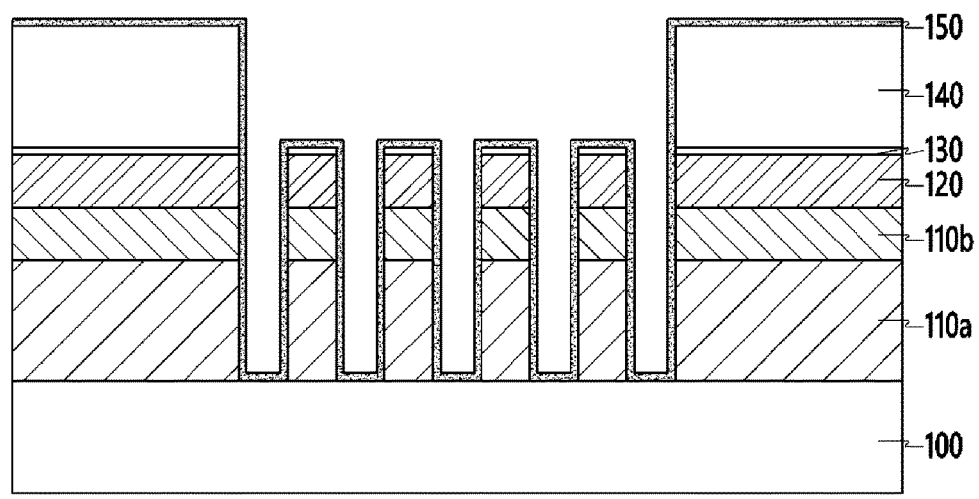
FIG. 15 is a view sequentially showing a manufacturing method of a liquid crystal display according to an exemplary embodiment of the present invention based on the opening part and the non-opening part of the lower polarizing plate.

Hereinafter, a manufacturing method of the liquid crystal display shown in FIG. 14 described above will be described with reference to FIGS. 14 and 15. FIG. 15 is a view sequentially showing a manufacturing method of a liquid crystal display according to an exemplary embodiment based on the opening part and the non-opening part of the lower polarizing plate. Description of the same configurations and structures of the exemplary embodiments described above will be omitted.

First, after the metal layers 110a and 110b, the material 120 for hard mask, and the resin 130 are sequentially stacked on the transparent substrate, an opening part of the resin 130 is pressurized by a linear pressurization mold. Next, linear patterns are formed by etching the resin 130. Next, the material 120 for the hard mask is linearly patterned using the resin linear patterns and the resin linear patterns are removed. Depending on the exemplary embodiment, the resin 130 may be processed so that only a portion thereof remains as shown in FIG. 15, without being perfectly removed. Next, as shown in FIG. 15, the metal layers 110a and 110b are etched using the linear patterns made of the material 120 for hard mask as an etching mask and a photosensitivity layer 140 is formed on a non-opening part that does not have the linear patterns. The hydrophobic layer 150 is formed so as to cover the photosensitivity layer 140 and surfaces of the linear patterns, that is, side wall portions, upper portions, and lower portions of the linear patterns. The hydrophobic layer 150 may be formed of a material containing fluorine or SiOC. The material containing fluorine may be formed by performing a plasma treatment process with gas containing fluorine. Next, the photosensitive layer 140 is removed. In this case, a portion of the hydrophobic layer 150 covering the upper portions of the linear patterns is removed together with the photosensitive layer 140. In the case in which the hydrophobic layer 150 on the surfaces of the linear patterns is removed, adhesion between the linear patterns and the hydrophobic passivation layer may be improved. Finally, as shown in FIG. 14, the passivation layer 160 of the lower polarizing plate is formed on the linear patterns and the hydrophobic layer 150. The passivation layer 160 of the lower polarizing plate may be formed of a hydrophobic material.

Here, in the case in which the passivation layer 160 of the lower polarizing plate is formed by an inkjet process, although not separately shown, an exemplary embodiment having an inkjet hydrophobic passivation layer 161 instead of the passivation layer 160 of the lower polarizing plate 160 in the exemplary embodiment of FIG. 14 is possible Although positions at which the hydrophobic layer 150 is formed has been described in the exemplary embodiments according to the drawings as described above, the present invention is not limited to the disclosure in the drawings and includes various modifications without departing from the spirit and scope of the disclosure, including the claims. As the hydrophobic layer 150 is formed on a larger area, an effect that prevents the deposition of the passivation layer material in the air gap may be maximized.

Figure 16:
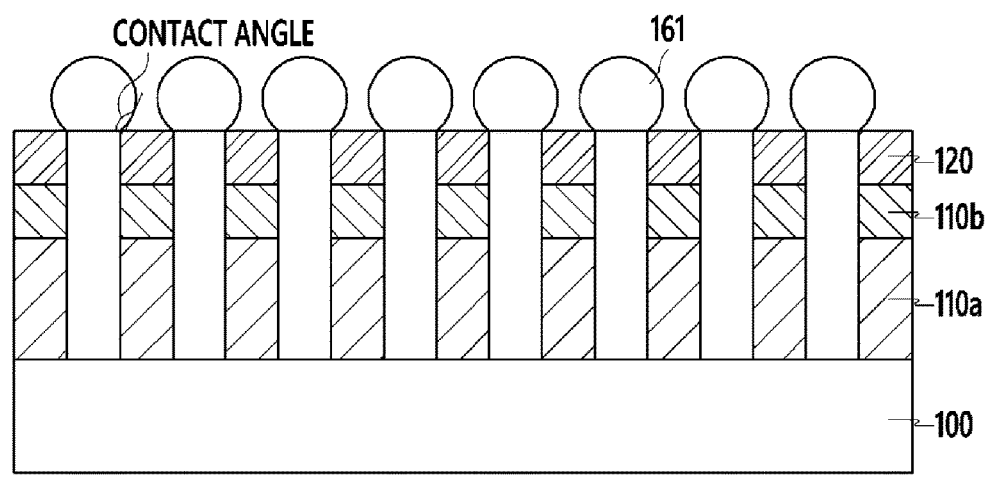
FIG. 16 is an enlarged view of a lower transparent substrate 100, an opening part of a lower polarizing plate, and an inkjet hydrophobic passivation layer 161 of the liquid crystal display according to an exemplary embodiment.

In addition, as in the exemplary embodiment shown in FIG. 16, an exemplary embodiment having only the inkjet hydrophobic passivation layer 161 without the hydrophobic layer 150 is also possible. Because the inkjet hydrophobic passivation layer 161 is present, it is possible to prevent the passivation layer material from being deposited in the air gap even though the hydrophobic layer 150 is not present. FIG. 16 is an enlarged view of a lower transparent substrate 100, an opening part of a lower polarizing plate, and an inkjet hydrophobic passivation layer 161 of the liquid crystal display according to an exemplary embodiment.

In the exemplary embodiments described above, the polarizing plate has the opening part and the non-opening part, the opening part has the plurality of linear patterns, the non-opening part has the planar shape pattern, but the entire polarizing plate may be formed of the opening part depending on the exemplary embodiment. That is, depending on the exemplary embodiment, the entire polarizing plate may be formed of the plurality of linear patterns.

In addition, in the exemplary embodiments described above, the reference numerals are used based on the lower polarizing plate, but may also be equally applied to the upper polarizing plate, and as long as at least one of the lower polarizing plate and the upper polarizing plate is the reflection type polarizing plate according to the present disclosure, the exemplary embodiments may be applied thereto. Depending on the exemplary embodiment, any one of the lower polarizing plate and the upper polarizing plate may also be an absorption type polarizing plate that absorbs light of one side polarized light and transmits only light of the polarized light perpendicular thereto. However, any one of the lower polarizing plate and the upper polarizing plate necessarily needs to correspond to the reflection type polarizing plate according to the present disclosure. Further, both the lower polarizing plate and the upper polarizing plate may be the reflection type polarizing plate according to the present disclosure. In addition, the exemplary embodiments applied to the lower polarizing plate and the upper polarizing plate may also be different from each other.

While embodiments have been described in connection with what is presently considered to be practical exemplary embodiments, it is to be understood that the invention is not limited to the disclosed embodiments, but, on the contrary, is intended to cover various modifications and equivalent arrangements included within the spirit and scope of the disclosure, including the appended claims.

| <Description of symbols> | |
|---|---|
| 10: backlight unit | 20: lower display panel |
| 30: liquid crystal layer | 40: upper display panel |
| 100: lower transparent substrate | 110a, 110b: metal layer |
| 115: lower polarizing plate | 120: material for hard mask |
| 130: resin | 140: photosensitive layer |
| 150: hydrophobic layer | |
| 160: passivation layer of lower polarizing plate | |
| 161: Inkjet hydrophobic passivation layer | 210: gate electrode |
| 220: gate insulating layer | 230: semiconductor |
| 240d: drain electrode | 240s: source electrode |
| 250: planarization insulating layer | 260: pixel electrode |
| 310: liquid crystal molecule | 410: upper transparent substrate |
| 415: upper polarizing plate | |
| 460: passivation layer of upper polarizing plate | |
| 470: light blocking member | 480: color filter |
| 490: common electrode | |

What is claimed is:

1. A liquid crystal display comprising:
a lower display panel including a lower polarizing plate disposed between a lower transparent substrate and a passivation layer of the lower display panel; and
an upper display panel including an upper polarizing plate disposed between an upper transparent substrate and a passivation layer of the upper display panel,
wherein at least one of the lower polarizing plate and the upper polarizing plate is a reflection type polarizing plate and includes a plurality of linear patterns arranged so as to be extended in one direction, a hydrophobic layer covering at least a portion of side wall portions of the linear patterns, and an interval part filled with air, and
wherein the interval part is disposed between the plurality of linear patterns.

2. The liquid crystal display of claim 1, wherein:
the hydrophobic layer is made of SiOC or a material containing fluorine.

3. The liquid crystal display of claim 2, wherein:
a portion facing at least the linear patterns among the passivation layer of the lower display panel and the passivation layer of the upper display panel is made of a hydrophobic material.

4. The liquid crystal display of claim 2, wherein:
a portion facing at least the linear patterns among the passivation layer of the lower display panel and the passivation layer of the upper display panel is formed so as to have a contact angle of 13° or more to 48° or less.

5. The liquid crystal display of claim 1, wherein:
the hydrophobic layer covers the entire side wall portions of the linear patterns and is made of SiOC or a material containing fluorine.

6. The liquid crystal display of claim 5, wherein:
a portion facing at least the linear patterns among the passivation layer of the lower display panel and the passivation layer of the upper display panel is made of a hydrophobic material.

7. The liquid crystal display of claim 5, wherein:
a portion facing at least the linear patterns among the passivation layer of the lower display panel and the passivation layer of the upper display panel is formed so as to have a contact angle of 13° or more to 48° or less.

8. The liquid crystal display of claim 1, wherein:
the hydrophobic layer covers at least a portion of upper portions and the side wall portions of the linear patterns and is made of SiOC or a material containing fluorine.

9. The liquid crystal display of claim 8, wherein:
a portion facing at least the linear patterns among the passivation layer of the lower display panel and the passivation layer of the upper display panel is made of a hydrophobic material.

10. The liquid crystal display of claim 8, wherein:
a portion facing at least the linear patterns among the passivation layer of the lower display panel and the passivation layer of the upper display panel is formed so as to have a contact angle of 13° or more to 48° or less.

* * * * *